March 8, 1949.　　　H. W. GILFILLAN　　　2,463,865
PUMPING LIMIT CONTROL APPARATUS
Filed June 5, 1944　　　5 Sheets-Sheet 1

Fig. 1.

INVENTOR.
HENRY W. GILFILLAN
BY
Harness and Harris

March 8, 1949. H. W. GILFILLAN 2,463,865
PUMPING LIMIT CONTROL APPARATUS
Filed June 5, 1944 5 Sheets-Sheet 2

Fig. 2.

INVENTOR.
HENRY W. GILFILLAN.
BY
Harness and Harris

March 8, 1949.  H. W. GILFILLAN  2,463,865
PUMPING LIMIT CONTROL APPARATUS
Filed June 5, 1944  5 Sheets-Sheet 4

INVENTOR.
HENRY W. GILFILLAN
BY
Harness and Harris

Patented Mar. 8, 1949

2,463,865

UNITED STATES PATENT OFFICE 2,463,865

PUMPING LIMIT CONTROL APPARATUS

Henry W. Gilfillan, Detroit, Mich., assignor to Chrysler Corporation, Highland Park, Mich., a corporation of Delaware Application June 5, 1944, Serial No. 538,733

16 Claims. (Cl. 230—115)

This application is a continuation-in-part of Gilfillan et al. application, Serial No. 480,786, filed March 27, 1943, now matured into Patent No. 2,402,885 of June 25, 1946.

This invention relates to a control device for obtaining a desired pressure and also to means for controlling pressures between a supercharger and an engine and for keeping a supercharger within its pumping limit. The invention is also concerned with novel bellows constructions.

In the aforementioned application of Gilfillan et al. there is disclosed a device for controlling intake pressure in a line between a supercharger and an engine and for keeping the supercharger within the pumping limit. The latter purpose is accomplished by the use of a pressure-responsive device operative upon a certain interrelation of increase of pressure in a gas passing through the supercharger and velocity head of gas entering the supercharger. Pressure in the line between the supercharger and the engine is kept at desired values by bellows, a manually adjustable rotor, and a vane within the rotor. These elements and the device for effecting pumping-limit are so interconnected that arrival or approach of the pumping limit in the supercharger may act through the said elements upon the pressure in the line between the supercharger and the engine to keep the supercharger away from the pumping limit. The invention of the present application relates to a modified and improved form of interconnection of the said elements and the pumping-limit-control device so that the entire system is more sensitive to pumping limit. The invention also relates to a novel arrangement of bellows, which may find use in controlling the intake pressure in the line between the supercharger and the engine. It also relates to improvements in the rotor and vane used in regulating the intake pressure.

An object of the present invention is to provide an improved apparatus for causing the arrival or approach of pumping limit in a supercharger to exert its effect upon automatic control of intake pressure in a line between the supercharger and an engine. More particularly, this apparatus may comprise a pumping limit-control device responsive to pumping limit as evidenced by a certain relation of pressure increase developed by the supercharger and velocity head. The pressure increase-velocity head device may be connected in a novel manner to the regulator for intake pressure.

A further object is to provide a novel arrangement of bellows. This arrangement may be applied as part of a regulator for intake pressure in a line between a supercharger and an engine. It may involve improvements in the interrelation of vacuum bellows, bellows responsive to intake pressure, and derivative bellows or any two of the bellows.

Another object is to provide improvements in a regulator comprising a manually adjustable rotor and a vane contained therein and controlled by fluid under pressure for movement with respect to the rotor and for conjoint movement with the rotor. The rotor may be manually controlled for a chosen value of intake pressure in a line between a supercharger and an engine, and the vane may be connected to a control in the line for directly affecting intake pressure. When the supercharger is of the axial type, the control may take the form of a spill valve acting on the line between the supercharger and the engine. When the supercharger is of the radial type, the control may be applied to a throttle valve on the entering side of the supercharger. The rotor and vane with their improvements may be employed in conjunction with the novel arrangement of bellows described in the preceding paragraph.

Other objects will appear from the disclosure.

It is to be understood that the novel features of the present invention will find special use with an aircraft power plant, although they are not limited to this use. It is frequently necessary to use a supercharger with an airplane engine, because the power demands are great upon the engine, and because the engine often operates at high altitudes where the volume of air for a given quantity of air for sufficient fuel consumption becomes exceedingly large. Operation of the supercharger becomes somewhat complicated, for the operating characteristics change with intake pressures determined by altitude. The pumping limit of the supercharger may be approached or reached, and this is particularly disadvantageous in the case of superchargers of the axial type, for very undesirable vibrations may be set up. Pumping limit is not dependent upon a particular intake pressure and may arise at a number of intake pressures. Thus, although for a given condition of engine operation it may be desirable to maintain a certain intake pressure, the arrival or approach of the pumping limit may overrule the desirability of a particular intake pressure. Consequently, it is of great advantage to interrelate a pumping-limit control with the regulator for intake pressure. This has been accomplished by the invention of the present application.

Figure 1:
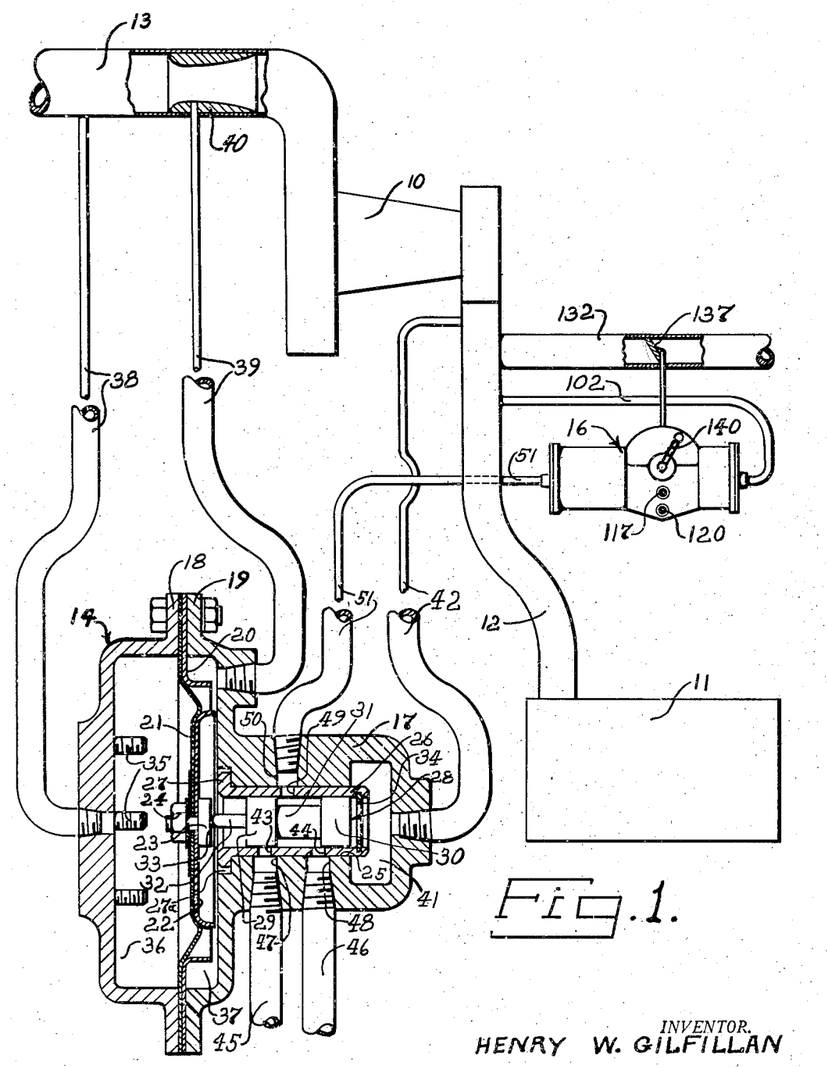
Fig. 1 is a view partially in section and partially in diagrammatic showing of the invention of the present application.

A supercharger 10 of the axial type is connected to an engine 11 by means of a conduit 12 which passes air delivered by the supercharger to the engine. The supercharger 10 receives air through a pipe 13. The reference character 14 indicates a pumping limit control device, and the reference character 16, a regulator for controlling pressure in the intake line 12 leading from the supercharger 10 to the engine 11.

Pumping limit control device 14 includes casing parts 17 and 18 joined by bolts and nuts as indicated at 19. The casing parts 17 and 18 clamp between them a flange ring 20 and a diaphragm 21. A shallow-cupped disc 22 is secured to the diaphragm 21 by means of a bolt 23 and a nut 24. The casing part 17 has a bore 25 in which is fixedly mounted a sleeve 26 having a flange 27 engaging a recess 27d in the casing part 17. Slidably mounted within the sleeve 26 is a piston device 28 formed of large spaced sections 29 and 30, a section 31 of somewhat smaller diameter joining the sections 29 and 30 and a rod-like projection 32 extending from the section 29 and having a round end 33 abutting the head of the bolt 23. A ring 34 set in a groove in the sleeve 26 prevents movement of the piston device 28 out of the sleeve in a direction to the right as viewed in Fig. 1. Screws 35 project from the casing part 18 toward the diaphragm 21 and serve as stops to movement of the diaphragm 21 to the left as viewed in Fig. 1. The diaphragm 21 divides the space enclosed by the casing parts 17 and 18 into a left-hand chamber 36 and a right-hand chamber 37. A line 38 connects the pipe 13 and the chamber 36. A line 39 connects a sleeve 40 of reduced Venturi section placed in the pipe 13 and the chamber 37. The portion of the casing part 17 to the right of the bore 25 is formed as an enlarged chamber 41. A line 42 connects this chamber and the intake line 12 leading from the supercharger 10 to the engine 11.

The operation of the pumping limit control device 14 is based on the disclosure forming the subject matter of the application of David M. Borden, Serial No. 518,829, filed January 19, 1944. As stated in that application, it has been discovered that if a supercharger of the axial type is to be kept within the pumping limit, there must be a certain relation between the velocity head of gas entering the supercharger and the increase in pressure of the gas developed by the supercharger. This relation may be expressed by the following equation:

$$P_2 - P_1 < K \tfrac{1}{2} \rho V_1^2$$

in which $P_1$ is the pressure of gas entering the supercharger, $P_2$ is the pressure of the gas delivered by the supercharger, K is a constant, $\rho$ is the density of the gas entering the supercharger, and $V_1$ is the velocity of the gas entering the supercharger. Thus the left side of the equation represents the increase in pressure produced by the supercharger, and the right side represents a constant times the velocity head of the gas entering the supercharger. If the left side of the equation becomes equal to or greater than the right side, the pumping limit of the supercharger is reached. $P_1$ is supplied through the line 38 to the chamber 36 and the left side of the diaphragm 21. A certain reduced pressure is supplied through the line 39 to the right side of the diaphragm 21 and the chamber 37. $P_2$ is supplied through the line 42 to the chamber 41 and the right end of the piston device 28. The difference between $P_1$ and the pressure developed in the venturi section 40 and made effective through the line 39 against the right side of the diaphragm 21 is a representation of the velocity head of the gas entering the supercharger 10. The velocity head acts in effect to move the diaphragm 21 to the right as viewed in Fig. 1, acting through the head of the bolt 33 also to move the piston device 28 to the right. This is opposed by force dependent upon the increase in the pressure developed by the supercharger tending to move the piston device 28 to the left. When the supercharger 10 is operating within pumping limit the velocity head is sufficiently great in relation to the increase in the pressure to make the diaphragm 21 occupy a position as shown in Fig. 1, in which the piston section 29 completely covers a port 43 in the sleeve 26 and the piston section 30 at least partially uncovers a port 44 in the sleeve. A drain line 45 and a pressure line 46 are connected respectively to passages 47 and 48 in the casing part 17 opposite the ports 43 and 44. The reduced section 31 of the piston device 28 is of sufficient length with respect to a port 49 in the sleeve 26 that it is always opposite the port 49 regardless of the position of the piston device 28. The port 49 communicates with an opening 50 in the casing part 17 to which is connected a line 51 running to the regulator 16. As previously stated, Fig. 1 shows the position of the piston device 28 when the supercharger 10 is within the pumping limit. In this position as shown, the port 43 leading to the drain line 45 is closed and the port 44 communicating with the pressure line 46 is open so that fluid under pressure forced through the line 46 passes through the port 49 into and through the line 51 to the regulator 16. When the pumping limit of the supercharger is reached, the piston device 28 moves to the left, and the port 43 is at least partially uncovered by the piston section 29 so that the pressure of the fluid flowing into the line 51 is reduced by escape of the fluid through the port 43 to the drain line 45. The device 14 may be so regulated that approach of a condition of pumping limit may cause uncovering of the port 43 and a consequent reduction of pressure in the line 51 with its effect upon the regulator 16 to be described presently. The amount that the port 43 becomes uncovered and the amount that the port 44 becomes covered will be determined by the extent to which pumping limit is reached or passed as reflected by movement of the piston device 28 to the left and will in turn determine the extent of reduction of pressure in the line 51 with its consequent effect upon the regulator 16.

Figure 2:
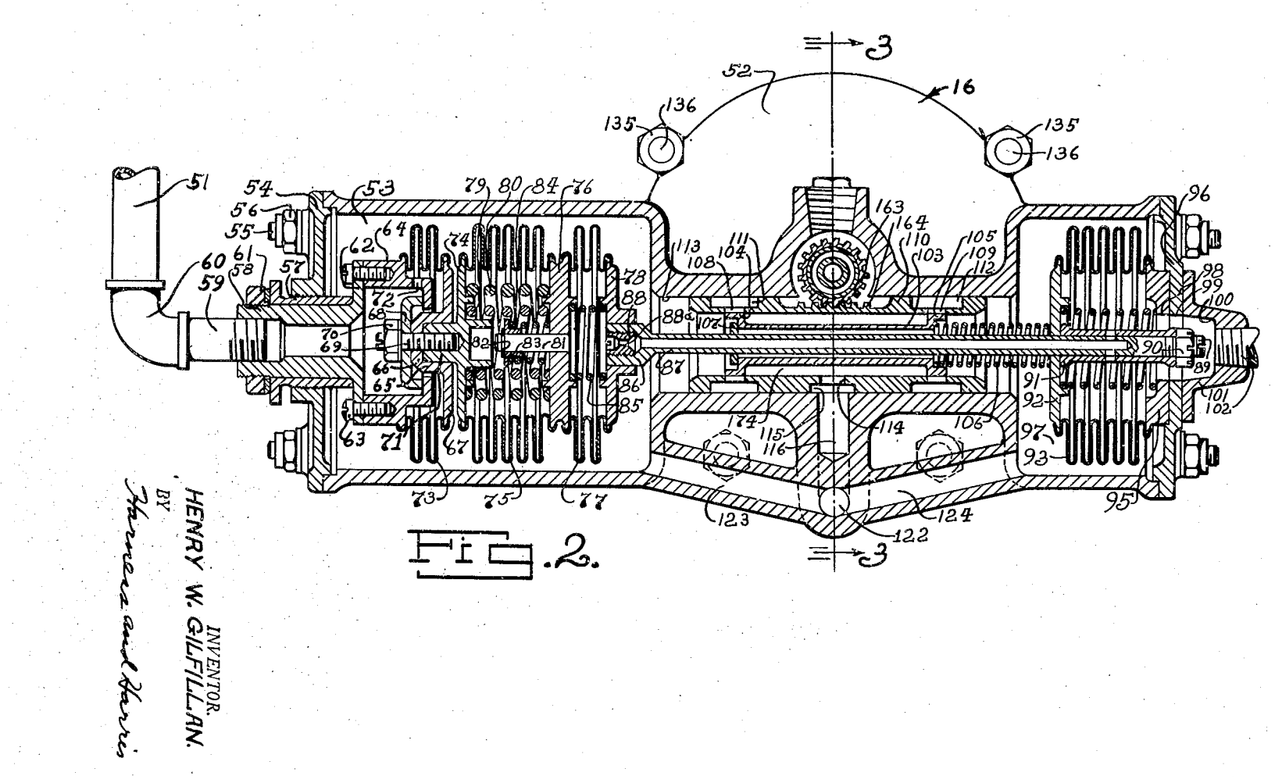
Fig. 2 is a sectional view taken on the line 2—2 of Fig. 3 and shows the regulator of the present invention.
Figure 3:
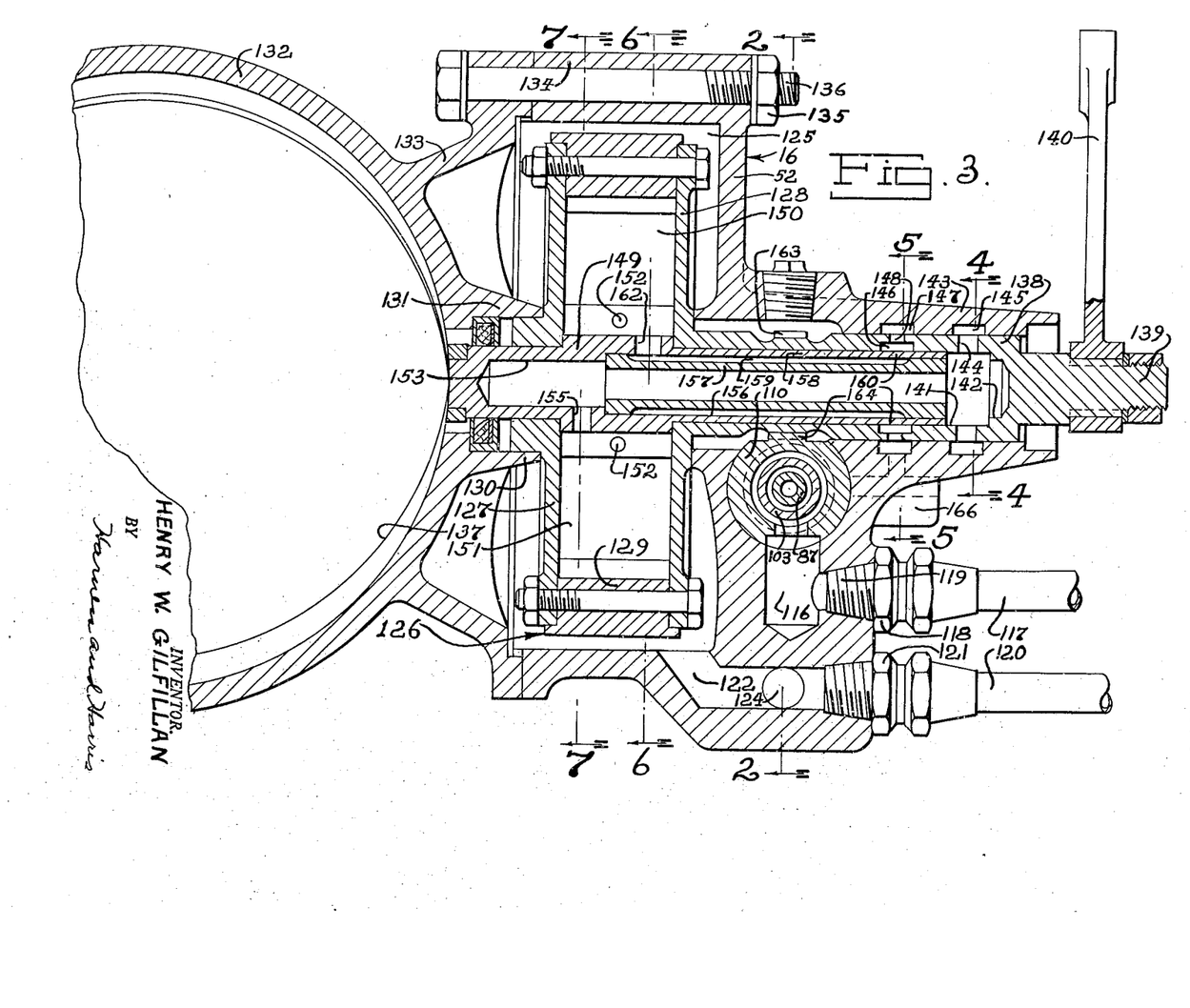
Fig. 3 is a sectional view taken on the line 3—3 of Fig. 2.

As seen in Fig. 2, the regulator 16 comprises casing 52 having an enlarged extended chamber 53 formed in its left end, as viewed in Fig. 2, and having an end member 54 secured thereto by bolts 55 and nuts 56. A flanged fitting 57 is threaded in an opening in the end member 54 and within the member 57 is another fitting 58. A short pipe section 59 is threaded within the fitting 58 and is joined by an elbow 60 to the line 51 extending from the pumping limit control device 14. A tightening ring 61 is threaded upon the fitting 58. The fitting 58 has an outwardly extending flange 62 within the chamber 53 to which is secured by screws 63 a cup-shaped member 64 having an opening in its base through which extends the central portion 65 of a member 66 having an outwardly extending flange 67. The member 66 is secured to a shallow cup-shaped member 68 by a screw 69 and a nut 70. The screw 69 is threaded into a part 71 extending into the central portion 65 of the member 66. The cup-shaped member 64 is provided with one or more openings 72. A corrugated bellows 73 is attached by its ends to the cup-shaped member 64 and the flange 67 of the member 66 by soldering or welding. Movement of the members 66 and 68 and the part 67 to the right is limited by engagement of the shallow cup-shaped member 68 with the base of the cup-shaped member 64. Movement of these same parts to the left is limited by engagement of the flange 67 of the member 66 with the base of the cup-shaped member 64. Fluid under pressure supplied through the line 51 reaches the bellows 73 and the amount of pressure determines the movement of the parts 66, 68, and 71 to the right. Fig. 2 shows these parts in their extreme position to the right. The part 71 has a flange 74 to which one end of bellows 75 is attached by soldering or welding. The other end of the bellows 75 is attached to an end member 76 to which one end of a bellows 77 is attached by soldering or welding. The other end of the bellows 77 is attached to an end part 78 by soldering or welding. The bellows 75 contains vacuum or a very reduced pressure. Springs 79 and 80 act against the members 74 and 76 to prevent collapse of the bellows 75. A rod 81 is secured to the end member 76 and extends within the bellows 75. A ring 82 is set in a groove in the rod 81. A flanged collar 83 is mounted upon the rod 81 and is urged against the ring by a spring 84 acting between the collar 83 and the end member 76. The collar 83 by engagement with the part 71 provides a yieldable stop resiliently resisting collapse of the bellows 75 beyond the point of engagement of the collar 83 with the part 71. A spring 85 resiliently resists collapse of the bellows 77. An enlarged portion 86 of a tubular member 87 is secured in the end member 78 for the bellows 77. A fitting 88 having a restricted bleed opening 88a is threaded in the enlarged portion 86. The tubular member 87 is of considerable length and has at the end opposite the enlarged portion 86 a closed threaded end 89. A nut 90 threaded on the end 89 holds a sleeve 91 on the tubular member 87 against an end member 92 to which one end of a bellows 93 is secured as by soldering or welding. The other end of the bellows 93 is secured to a ring 95 as by soldering or welding, which ring is in turn secured to an end plate 96 for an enlarged chamber 97 formed at the right end of the casing 16. The ring 95 and the end member 96 have openings 98 and 99 through which the threaded end 89 of the tubular member 87 extends. This threaded end 89 also extends into a cavity 100 formed in a fitting 101 closing the openings 98 and 99. To the fitting 101 is connected a line 102 extending from the intake line 12 between the supercharger 10 and the engine 11. Pressure of the gas delivered by the supercharger 10 is transmitted through the line 102 to the interior of the bellows 93. Surrounding the tubular member 87 is a valve part 103 having an enlarged flange 104 at the left end and an enlarged flange 105 at the right end. The flange 105 receives in a recess formed therein one end of a coil spring 106, the other end of which abuts the end member 92. The flange 104 receives in a recess formed therein a ring 107 secured to the tubular member 87. In the position of Fig. 2 the flanges 104 and 105 on the valve part 103 cover ports 108 and 109 formed respectively in left and right portions of a valve part 110. Outward of the ports 108 and 109 are annular recesses 111 and 112 respectively formed in the valve part 110. The casing 52 has a bore 113 joining the chambers 53 and 97 and slidably receiving the valve part 110. The valve part 110 has at its central region an opening 114 having an enlarged outer portion 115. A passage 116 in the casing 52 registers with the enlarged portion 115. As seen in Fig. 3 a pressure line 117 is attached to the casing 52 so as to communicate with the passage 116 by means of a fitting 118 threaded in an opening 119. A drain line 120 is attached by means of a fitting 121 to the casing 52 and communicates with a passage 122 extending rearwardly as viewed in Fig. 3. The passages 123 and 124 extend to the passage 122 from the chambers 53 and 97 respectively.

As seen in Fig. 3 the rear central portion of the casing 52 has formed therein a chamber 125 with which the passage 122 communicates. Positioned in this chamber is a rotary housing 126 formed of end members 127 and 128 and a ring 129 spacing the end members from one another. A bearing portion 130 on the end member 127 journals the end member in a portion 131 integral with a pipe 132 connected to the pipe 12. The pipe 132 has outwardly projecting portions 133 which mate with portions 134 of the casing 52 to form the chamber 125. Nuts 135 and bolts 136 passing through these portions secure the casing 52 to the pipe 132. Positioned within the pipe 132 is a spill valve 137. The end part 128 of the rotatable housing 126 has a thin tubular axial extension 138 which extends forwardly or to the right as viewed in Fig. 3 and has a closed portion 139 upon which is secured an arm 140. The axial extension 138 has a bore 141 having a closed end 142. The axial extension 138 fits tightly within a portion 143 of the casing 52. Three circumferentially spaced openings 144 extend outwardly from the bore 141 adjacent its end and communicate with an annular groove 145 formed in the portion 143 of the casing 52. An annular groove 146 formed in the bore 141 communicates with an annular groove 147 formed in the portion 143 of the casing 52 through circumferentially spaced openings 148 in the axial extension 138.

Figure 6:
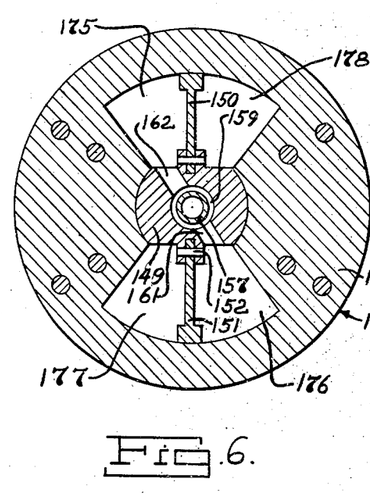

Mounted within the rotary housing 126 is a vane member formed of a hub 149 and vanes 150 and 151 pinned thereto, as indicated at 152. The hub 149 has a bore 153 with a closed end formed therein and from the bore 153 extend outwardly passages 154 and 155. Extending axially of the bore 153 is an enlarged bore 156 in which is mounted a sleeve 157. The hub 149 has a tubular extension 158 extending forwardly from the hub or to the right as viewed in Fig. 3. The tubular extension 158 comprises in effect an axial extension of the vane member and fits within the bore 141 in the axial extension 138 of the rotary housing 126. The sleeve 157 is spaced from the tubular extension 158 except at its end portions, as indicated at 159, so that an annular space is provided between the sleeve 157 and the tubular extension 158. A plurality of circumferentially spaced openings 160 form a communication between the annular groove 146 in the extension 138 and the space 159. As seen in Fig. 6, a pair of openings 161 and 162 in the hub 149 extend outwardly from the space 159. The tubular extension 138 of the rotary housing 126 has a gear 163 formed externally thereon which meshes with a rack 164 formed on the exterior of the valve part 110. The hub 149 is secured to the spill valve 137.

Figure 4:
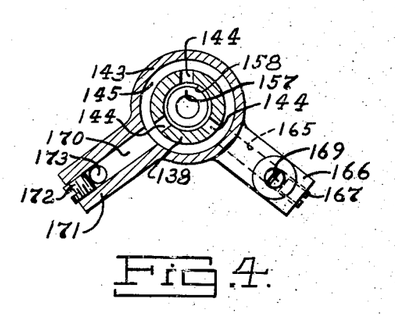
Figs. 4, 5, 6, and 7 are sectional views taken respectively on the lines 4—4, 5—5, 6—6, and 7—7 of Fig. 3.
Figure 5:
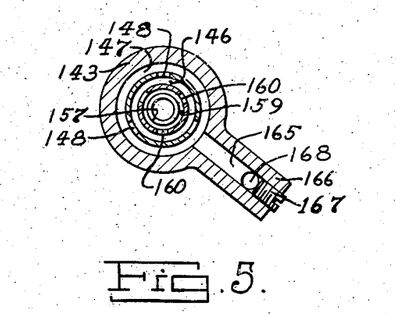

As seen in Figs. 3 and 5, a passage 165 extends from the annular groove 147 through a portion 166 of the casing 52. A plug 167 closes the end of the passage 165. A passage 168 extends from the passage 165 to the annular groove 112 formed on the valve member 110. The end of the passage 168 is closed by a plug 169. As seen in Fig. 4, a passage 170 formed in a portion 171 of the casing 52 extends from the annular groove 145. The outer end of the passage 170 is closed by a plug 172. A passage 173 extends from the passage 170 to the annular groove 111 in the valve member 110.

Figure 7:
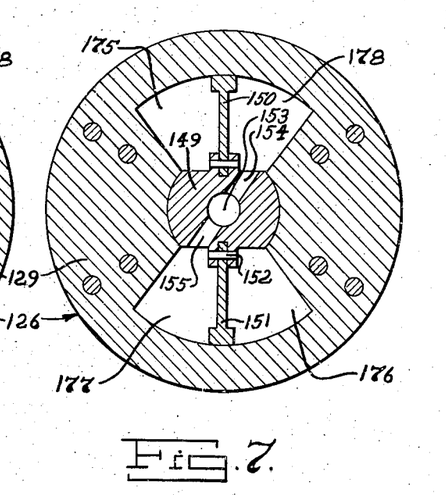

Angular position of the arm 140 determines the pressure in the line 12 between the supercharger 10 and the engine 11 that the regulator 16 strives to effect. When this condition obtains, the flanges 104 and 105 cover the ports 108 and 109 respectively so that there is a fluid lock of the vane member within the rotary housing 126. Now let it be supposed that a higher intake pressure in the line 12 is desired. To effect this the arm 140 is moved angularly in a direction away from the observer in Fig. 3. Since the arm is secured to the rotary housing 126, the housing 126 rotates with the arm 140 or clockwise as viewed in Figs. 6 and 7. Because of the fluid lock of the vane member within the rotary housing 126 due to the covering of the ports 108 and 109 by the flanges 104 and 105, the vane member rotates clockwise with the housing 126 causing the spill gate 137 because of its securement to the vane member to be rotated clockwise to an approximate position for the increased pressure in the line 12. It will be evident from Fig. 1 that a clockwise rotation of the spill gate 137 means a decrease in the opening of the spill gate. Clockwise rotation of the arm 140 and the rotary housing 126 means a clockwise rotation of the gear 163 as viewed in Fig. 2. As a result thereof the gear 163 acting through the rack 164 on the valve part 110 causes the valve part to be moved to the left as viewed in Fig. 2. This causes an uncovering of the ports 109 to a space 174 between the flanges 104 and 105 of the valve member 103 and a communication through this space and the port 114 between the ports 109 and the passage 116 to which the pressure line 117 is connected. This fluid under pressure flows through the ports 109, the annular groove 112, the passage 168, the passage 165, the groove 147, the openings 148, the groove 146, the openings 160, the space 159, and the passages 161 and 162 into chambers 175 and 176, respectively, to the right of vane 151 and to the left of vane 150 as indicated in Fig. 6. This causes a clockwise rotation of the vanes 150 and 151 and so their rotation is in the same direction as that of the rotatable housing 126. The reduced opening of the spill gate 137 increases the pressure in the delivery side of the supercharger 10 in the line 12 and consequently the pressure within the bellows 93 is increased. This causes the tubular member 87 to move to the left, as viewed in Fig. 2. The valve part 103 under the action of the spring 106 also moves to the left. When the pressure in the line 12 reaches the desired amount as determined by the position of the arm 140, the flanges 104 and 105 on the valve part 103 cover the ports 108 and 109 in the valve part 110. Thus clockwise movement of the vanes 150 and 151 stops and they are locked with respect to the rotary housing because of the fluid locks existing in both sides of the vanes causing the seating of the flanges 104 and 105 on the ports 108 and 109. During this time clockwise movement of the vane members 150 and 151 reduces the size of chambers 177 and 178 positioned respectively to the left of vane member 151 and to the right of vane member 150 is reduced. Fluid escaping from these chambers passes through the passages 154 and 155, the tube 157, ports 144, groove 145, passages 170 and 173, and ports 108 to the annular groove 111. Since at this time the valve part 110 is to the left of the position shown in Fig. 2, the escaping fluid passes from the annular groove 111 to the left of the valve parts into the chamber 53 and thence through the passages 123 and 122 to the drain line 120.

If a lower pressure in the line 12 is desired, the spill gate 137 in the pipe 132 must be rotated counterclockwise to increase its opening. This requires a counterclockwise angular movement of the arm 140 or, as viewed in Fig. 3, a movement of that arm toward the observer. As a result of such movement the rotary housing 126 is moved counterclockwise and because of the fluid lock existing between the vanes 150 and 151 and the housing 126 the vanes are also moved counterclockwise and bring the spill gate 137 to an approximate position for the new lower pressure. During this time the gear 163 is rotated counterclockwise and acts through the rack 164 to shift the valve part 110 to the right. This causes the port 108 and the annular groove 111 to be connected through the space 174 with the port 114 and the annular groove 115 to which fluid under pressure is supplied through the passage 116 and the pressure line 117. Because of the communication between the passage 173 (Fig. 4) and the annular groove 111, fluid under pressure is supplied through the passage 170, the annular groove 145, the ports 144, to the inside of the sleeve 157. From there the fluid under pressure moves through the passages 154 and 155 to chambers 177 and 178. This causes the vanes to be moved counterclockwise just as the rotary housing 126 has been moved, and the spill gate is adjusted to a final position that will bring the new desired lower pressure. As the pressure in the line 12 decreases toward the new desired lower value the pressure within the bellows 93 reduces moving the tubular member 87 and the valve part 103 to the right as viewed in Fig. 2. Eventually the flanges 104 and 105 cover the ports 108 and 109 and fluid under pressure no longer flows to the chambers 177 and 178. A fluid lock is reestablished between the vanes 150 and 151 and the rotary housing 126. During the time that the vane members 150 and 151 are moved counterclockwise the chambers 175 and 176 are being reduced in size fluid escapes from them through the openings 161 and 162 and eventually reaches the annular groove 112 and ports 109. Since at this time the valve part 110 has been moved to the right from the position of Fig. 2 the escaping fluid passes from the annular groove 112 at the right end of the valve parts to the chamber 97 and thence through the passages 124 and 122 to the drain line 120.

Let it now be assumed that no change in pressure in the line 12 is desired but that an undesired increase in the pressure in this line has taken place. The result of the increase in pressure in the bellows 93 causes the tubular member 87 and the valve part 103 to move to the left, as viewed in Fig. 2. This causes the space 174 to establish communication between the ports 108 and 114. Fluid under pressure passes from the line 117 through the port 114 and the space 174 to the ports 108. Since, as previously described, the ports 108 are in communication with the passages 154 and 155, fluid under pressure is admitted to the chambers 177 and 178 and causes the vanes 150 and 151 to be moved counterclockwise. This brings about a counterclockwise movement of the spill gate 137, thereby increasing its opening and reducing the pressure in the line 12. When the pressure for which the arm 140 has been set is re-established, the bellows 93 moves the tubular member 87 and the valve part 103 to the right to bring the flanges 104 and 105 back to seating position upon the ports 108 and 109. Movement of the vanes 150 and 151 is stopped and the vanes are again locked within the rotary housing 126.

If the pressure in the line 12 goes below the predetermined pressure, the collapse of the bellows 93 moves the tubular member 87 and the valve part 103 to the right. This places the space 174 to which fluid under pressure is supplied from the pressure line 117, in communication with the parts 109 and the annular groove 112. From there fluid under pressure passes in the manner previously described to the chambers 175 and 176 causing a clockwise movement of the vanes 150 and 151 and a similar movement of the spill gate 137 toward closed position. This raises the pressure in the line 12 causing the bellows 93 to expand and move the valve part 103 back to a position in which the flanges 104 and 105 cover the ports 108 and 109. The fluid lock of the vanes 150 and 151 within the rotary housing 126 is re-established and movement of the spill gate 137 is stopped.

It will be observed that bellows 77 is smaller than bellows 93 and has a subtracting effect upon bellows 93, and in its effect upon the position of the valve part 103 because the two bellows are one opposite sides of the connecting tube 87. The effect of the restricting orifice 88ᵃ in the fitting 88 in the tube 87 at the entrance to the bellows 77 is to accelerate shifting of the valve part 103 when there are sudden changes in pressure in the line 12. This is due to the fact that the restricting orifice 88ᵃ temporarily halts the increase or decrease of pressure in the bellows 93 and thus temporarily removes the substracting effect of the bellows 77 upon the bellows 93. The result is a rather immediate adjustment of the valve part 103.

It will be observed from Fig. 2 that member 68 contacts part 64, and therefore the members 66 and 68 and the part 74 are as far to the right as they may be. Shifting of these members to the left acts through the bellows 75 and 77 and the tubular member 87 to shift the valve part 103 to the left. This causes the space 174 between the flanges 104 and 105 and valve part 103 to place the ports 108 and groove 111 in communication with the fluid under pressure received from the pressure line 117, the passage 116, the groove 115, and the port 114. Since the ports 108 and groove 111 are in communication with the chambers 177 and 178 shown in Fig. 7, the vanes 150 and 151 are caused to rotate counterclockwise moving the spill gate 37 counterclockwise to a more open position reducing the pressure in the line 12. The reduced pressure in the line 12 causes the bellows 93 to collapse somewhat shifting the tubular member 87 and the valve 103 back to the right until the flanges 104 and 105 again cover the ports 108 and 109. During this time there has been no change in the position of the manual arm and the rotatable housing 126 and yet there has been a reduction in the intake pressure. The shifting of the members 66 and 68 and the part 71 to the left is due to the approach or arrival of the supercharger 10 at the pumping limit. When this condition obtains, the increase in the pressure produced by the supercharger becomes too large for the velocity head of the gas entering the supercharger. This results in a movement to the left of the piston device 28, causing the piston section 29 to uncover the port 43 leading to the drain line 45. Thus there is a reduction in pressure in the line 51 with a consequent reduction in pressure of the fluid within the bellows 73 causing the members 66 and 68 and the part 71 to move to the left of the position shown in Fig. 2. As previously stated, the result of the leftward movement is to move the valve part 103 temporarily to the left, and thereby the opening of the valve 137 is increased. Consequently, an increase in the flow with resultant increase in velocity head of the gas flowing through the supercharger and/or reduction in pressure in the line 12 may take place. Thus the supercharger 10 is kept away from the pumping limit or prevented from exceeding it by reduction in pressure of the gas delivered by the supercharger. When the supercharger is no longer at or near the pumping limit the piston device moves to the right causing the piston section 29 to close the port 43 leading to the drain line 45. Thereupon the pressure in the line 51 and within the bellows 77 increases causing the members 66 and 68 and the part 71 to move to the right. As a result the valve part 103 moves temporarily to the right calling for a decrease in the opening of the valve 137.

The pumping-limit control device 14 acts through shifting of the parts 66, 68, and 71 to provide, in effect, an adjustment of the datum of the pressure regulator 16. If the regulator is set for a certain intake pressure in the line 12 as determined by a certain angular position of the arm 140, the pumping-limit control device 14 acts to lower the pressure in the line 12 below that for which the arm 140 is set, or, in other words, adjusts the datum of the regulator. This is effected by shifting of the valve part 103 through movement of the parts 66, 68, and 71.

The pumping-limit-control device shown is one acting upon a certain relation of pressure increase produced by the supercharger and velocity head of gas entering the supercharger, but this is for the purpose of illustration only. Other types of pumping-limit-control devices may be associated with the regulator 16 in the manner illustrated.

Figures 8, 9:
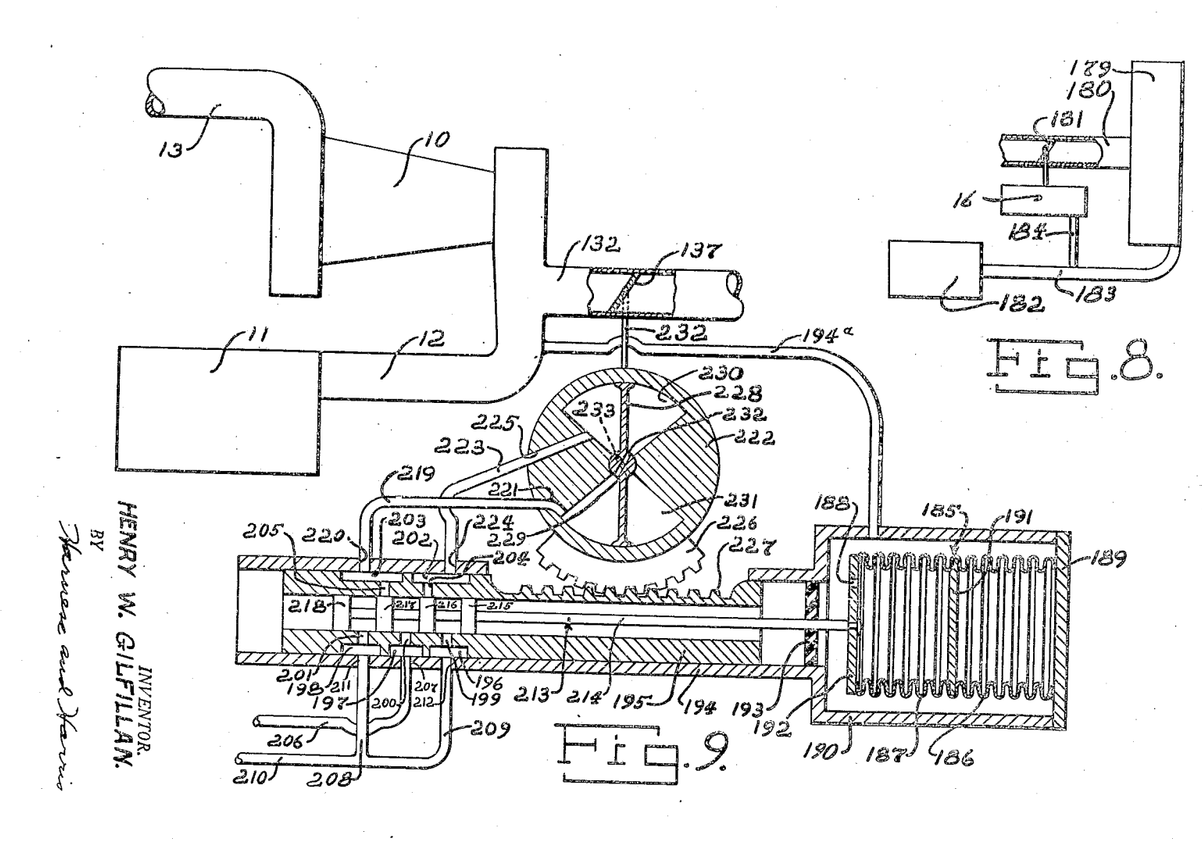
Fig. 8 shows diagrammatically a modified form of the invention as seen in Fig. 1.
Fig. 9 is a view partially in section and partially diagrammatically of a second modification of the invention.

Fig. 8 shows the regulator 16 applied to a radial supercharger 179. A line 180 for gas going to the supercharger carries mounted therein a throttle valve 181. An engine 182 is connected to the supercharger by an intake line 183. A line 184 connects the line 183 between the supercharger and the engine and the regulator 16. The regulator 16 in Fig. 8 is the same as that in the preceding figures in that it is subject to pressure in the line between the supercharger and the engine. However, there is no interconnection of the regulator wtih a pumping-limit-control device since it is not necessary to keep the radial supercharger away from the pumping limit. The regulator 16 of Fig. 8, instead of controlling a spill gate connected to the line between the supercharger and an engine, controls the throttle valve 181. The arrangement is such that when the pressure in the line 183 rises above that for which the regulator is set, the regulator produces the opening of the throttle valve 181, and if the pressure in the line 183 falls below the pressure called for by the regulator 16, the opening of the throttle valve 181 is increased.

Fig. 9 shows a form of the invention in which a bellows construction 185 comprises a bellows 186 containing a vacuum and a bellows 187 having a restricted opening 188. The bellows 186 is secured to an end member 189 of a housing 190. The bellows 186 and 187 are directly attached to one another through a common end wall 191. The bellows 187 has an end wall 192 in which is located the restricted opening 188 previously referred to. A sealing member 193 seals the housing 190 from a tubular extension thereof 194. A line 194a communicates pressure of the delivery line 12 of the supercharger 10 to the housing 190. Slidably mounted on the tubular extension 194 is an outer valve part 195 having at one side three grooves 196, 197, and 198 and three ports 199, 200, and 201 communicating with the previously mentioned grooves respectively. At the other side of the outer valve part 195 are extended grooves 202 and 203 communicating with ports 204 and 205. A pressure line 206 is connected at an opening 207 in the tubular extension 194 directly opposite the groove 197. Lines 208 and 209 merging into a common drain line 210 are connected respectively to the tubular extension 194 at openings 211 and 212 directly opposite grooves 196 and 198 respectively in the outer valve part 195. Slidably mounted within outer valve part 195 is an inner valve part 213 having a stem 214 securely attached to the end wall 192 of the bellows 187 and spaced valve sections 215, 216, 217, and 218. A line 219 extends from an opening 220 in the tubular extension 194 directly opposite the groove 203 to a passage 221 in a rotatable housing 222. A line 223 extends from an opening 224 in the tubular extension 194 directly opposite the groove 202 to a passage 225 in the rotary housing 222. The housing 222 has attached thereto a gear segment 226 in mesh with a rack 227 formed on the outer valve part 195. Positioned within the housing 222 is a vane 228 having a hub 229. The vane 228 is capable of angular movement with respect to the housing 222 about the hub 229. The vane moves in chambers 230 and 231 formed in the rotary housing 222. A passage 232 provides communication between the portion of the chamber 231 to the left of the vane 228 and the portion of the chamber 230 to the right of the vane 228. A passage 233 in the hub provides communication between the portion of the chamber 231 to the right of the vane 228 and the portion of the chamber 230 to the left of the vane.

The operation of the device of Fig. 9 will be described only briefly since it is more fully described and claimed in the copending application of Gilfillan et al., Serial No. 480,786, filed March 27, 1943, now matured into Patent No. 2,402,885 of June 25, 1946, and the copending application of Wyckoff, Serial No. 516,359, filed January 31, 1944. The important part of Fig. 9 so far as the present application is concerned, is the bellows construction 185. Since the housing 190 is subjected through the line 194a to the delivery pressure of the supercharger 10, that is the pressure of the gas in the line 12 and therefore the degree of expansion or collapse of the bellows 185 is dependent upon this pressure. As the pressure increases, the bellows 186 tends to collapse. As the pressure decreases, the bellows 186 tends to expand. The restricting opening 188 in the bellows 187 causes the pressure upon the bellows to be the same both inside and outside and, therefore, the final position of the bellows construction 185 will always be dependent upon the collapse or expansion of the bellows 186. However, with sudden changes in pressure in the line 12 and corresponding sudden changes in the housing 190, the restricted opening 188 in the bellows 187 temporarily delays these changes in pressure to the interior of the bellows 187. Thus, for example, if there is a sudden rise in pressure, the pressure within the bellows 187 is for a short time somewhat less than that outside the bellows 187. Consequently, not only the bellows 186 but also the bellows 187 collapses. Thus there is a greater total collapse of the bellows construction 185. However, after a short time the pressures inside and outside the bellows 187 become equalized and the bellows expand somewhat. This final expansion of the bellows 187 has a slight subtracting effect upon the total amount of contraction of the bellows 186 resultant from the increase in pressure. With the arrangement just described the bellows construction 185 reaches a more collapsed state with a sudden increase of pressure more rapidly. Conversely if the pressure in the line 12 and the housing 190 decreases suddenly, the pressure within the bellows 187 is momentarily greater than that outside of the bellows. Thus there is an expansion of the bellows 187. This is added to the normal expansion of the bellows 186 and brings a greater expansion for the bellows construction 185. When, after a few moments, the lower pressure or the decrease in pressure is communicated to the interior of the bellows 187 it collapses slightly and so has a subtracting effect upon the expansion of the bellows 186. The result is, for a sudden decrease in pressure, a faster expansion of the bellows construction 185.

Angular position of the rotary housing 222 determines through the setting of the spill gate 137 in the outlet 132, a predetermined value of pressure in the line 12. When the actual pressure in the line 12 is equal to the predetermined pressure as determined by the angular position of the housing 222, the resultant position of the bellows construction 185 causes the valve sections 216 and 217 to cover the ports 204 and 205 and thereby to maintain a fluid lock of the vane 228 in the rotary housing 222. The angular position of the vane 228 determines the angular position of the spill gate 137 and consequently, the amount of its opening because the vane and spill gate are connected to one another through a means represented diagrammatically and designated by the reference character 232. If the pressure in the line 12 becomes greater or less than the predetermined pressure as set by angular position of the rotary housing 222, the resultant collapse or expansion of the bellows construction 185 shifts the inner valve part 213 to the right or to the left causing the ports 204 and 205 to become uncovered. If the valve part 213 shifts to the right with an increase of pressure resulting in collapse of the bellows construction 185, the line 223 is placed in communication with the pressure line 206, and the line 219, in communication with the drain line 219. The result is a clockwise movement of the vane 228 and a similar clockwise movement of the spill gate 137 to a more open position. As a result, pressure in the line 12 decreases and the bellows construction 185 expands until the valve sections 216 and 217 again cover the ports 204 and 205, re-establishing a fluid lock of the vane 228 in the housing 222 and halting the opening of the spill gate 137. If the pressure in the line 12 decreases below the predetermined pressure, the inner valve part 213 moves to the left upon the resultant expansion of the bellows construction 185, and the line 219 is placed in communication with the pressure line 206, and the line 223, in communication with the drain line 219. As a result, the vane 228 is moved counterclockwise effecting a similar counterclockwise movement of the spill gate 137 to a more closed position. An increase in the pressure in the line 12 results, and the bellows construction 185 collapses sufficiently to move the valve sections 216 and 217 back to covering relation with the ports 204 and 205, and thereby fluid lock of the vane 228 in the rotary housing 222 is re-established.

When a higher pressure or a lower pressure is desired in the line 12, the rotary housing 222 is moved counterclockwise or clockwise to the appropriate position. The fluid lock of the vane 228 maintained for the moment, causes a corresponding counterclockwise movement or clockwise movement of the vane 228 and of the spill gate 137. Thus the spill gate 137 is brought to an approximate position for the new predetermined pressure. The counterclockwise movement or the clockwise movement of the rotary housing 222 acts through the gear segment 226 and the rack 227 to move the outer valve part 195 to the right or to the left. As a result the valve sections 216 and 217 no longer cover the ports 204 and 205. Depending upon the direction of movement of the outer valve part 195 either the line 223 or the line 219 is placed in communication with the pressure line 206 resulting in either clockwise movement of the vane 228 and of the spill gate 137 to a more open position or a counterclockwise movement of the vane and of the spill gate to a more closed position. The resultant change in pressure through change in the position of the spill gate 137 produces the corresponding expansion or collapse of the bellows construction 185, and the valve sections 216 and 217 again cover the ports 204 and 205, thereby re-establishing the fluid lock of the vane 228 in the rotary housing 222 and a holding of the spill gate 137.

The intention is to limit the invention only within the scope of the appended claims.

I claim:

1. In combination, a first bellows containing a vacuum, a second bellows spaced from the first bellows and having its interior connected to a pressure that is to be regulated, means connecting the two bellows with one another, a manually adjustable means adapted to be set for a certain desired value of the pressure to be regulated, an operator, means for supplying fluid under pressure to space between the operator and the manually adjustable means to hold them against relative movement, cooperating valve parts controlling supply of fluid under pressure to the operator and the manually adjustable means for locking and unlocking them against relative movement, means connecting one valve part with the manually adjustable means for conjoint movement therewith, and means connecting the other valve part for conjoint movement with the means connecting the first and second bellows.

2. In combination, a housing manually rotatable to a position representing a predetermined value of pressure, a vane rotatably mounted within the housing, a pair of conduits for fluid leading to opposite sides of the vane, a pair of cooperating valve parts blocking escape of fluid from said conduits for providing a fluid lock of the vane in the housing and thereby causing movement of the housing to its said position to bring the vane to an approximate position for the said predetermined value of pressure, means connecting one valve part with the housing for causing the said movement of the housing to shift the said one valve part with respect to the other valve part and thereby to admit fluid under pressure to the conduit leading to one side of the vane and to open the other conduit to drain for moving the vane relative to said housing, and means responsive to arrival of the pressure at the said predetermined value for positioning the said other valve part with respect to the said one valve part to block the escape of fluid from both conduits, said last mentioned means comprising a pair of spaced bellows, one containing a vacuum and the other connected to a source of fluid pressure, the said pair of cooperating valve parts being positioned between the bellows, means connecting the bellows, and means connecting the said other valve part with the bellows-connecting means for conjoint movement therewith.

3. In combination, a housing manually rotatable to a position representing a predetermined value of pressure and having a thin tubular axial extension, a vane rotatably mounted within the housing and having a thin tubular axial extension positioned within that of the housing and forming with that of the housing conduits for fluid leading to opposite sides of the vane, a pair of cooperating valve parts blocking escape of fluid from said conduits for providing a fluid lock of the vane in the housing and thereby causing movement of the housing to its said position to bring the vane to an approximate position for the said predetermined value of pressure, means connecting one valve part with the housing for causing the said movement of the housing to shift the said one valve part with respect to the other valve part and thereby to admit fluid under pressure to the conduit leading to one side of the vane and to open the other conduit to drain for moving the vane relative to said housing, and means responsive to arrival of the pressure at the said predetermined value for positioning the said other valve part with respect to the said one valve part to block the escape of fluid from both conduits.

4. In combination, a housing manually rotatable to a position representing a predetermined value of pressure and having a thin tubular axial extension, a vane rotatably mounted within the housing, and having a thin tubular axial extension positioned within that of the housing and forming with that of the housing a pair of conduits for fluid leading to opposite sides of the vane, a pair of cooperating valve parts blocking escape of fluid from said conduits for providing a fluid lock of the vane in the housing and thereby causing movement of the housing to its said position to bring the vane to an approximate position for the said predetermined value of pressure, a gear formed on the tubular extension of the housing, a rack formed on one of the valve parts, the gear and the rack meshing to cause the said movement of the housing to shift the said one valve part with respect to the other valve part and thereby to admit fluid under pressure to the conduit leading to one side of the vane and to open the other conduit to drain for moving the vane relative to said housing, and means responsive to arrival of the pressure at the said predetermined value for positioning the said other valve part with respect to the said one valve part to block the escape of fluid from both conduits.

5. In combination, a housing manually rotatable to a position representing a predetermined value of pressure and having a thin tubular axial extension, a vane rotatably mounted within the housing and having a thin tubular axial extension positioned within that of the housing and forming with that of the housing conduits for fluid leading to opposite sides of the vane, a pair of cooperating valve parts blocking escape of fluid from said conduits for providing a fluid lock of the vane in the housing and thereby causing movement of the housing to its said position to bring the vane to an approximate position for the said predetermined value of pressure, means connecting one valve part with the housing for causing the said movement of the housing to shift the said one valve part with respect to the other valve part and thereby to admit fluid under pressure to the conduit leading to one side of the vane and to open the other conduit to drain for moving the vane relative to said housing, and means responsive to arrival of the pressure at the said predetermined value for positioning the said other valve part with respect to the said one valve part to block the escape of fluid from both conduits, said last mentioned means comprising a pair of spaced bellows, one containing a vacuum and the other connected to pressure, the said pair of cooperating valve parts being positioned between the bellows, means connecting the bellows and means connecting the said other valve part with the bellows-connecting means for conjoint movement therewith.

6. In combination, a housing manually rotatable to a position representing a predetermined value of pressure and having a thin tubular axial extension, a vane rotatably mounted within the housing and having a thin tubular axial extension positioned within that of the housing and forming with that of the housing a pair of conduits for fluid leading to opposite sides of the vane, a pair of cooperating valve parts blocking escape of fluid from said conduits for providing a fluid lock of the vane in the housing and thereby causing movement of the housing to its said position to bring the vane to an approximate position for the said predetermined value of pressure, a gear formed on the tubular extension of the housing, a rack formed on one of the valve parts, the gear and the rack meshing to cause the said movement of the housing to shift the said one valve part with respect to the other valve part and thereby to admit fluid under pressure to the conduit leading to one side of the vane and to open the other conduit to drain for moving the vane relative to said housing, and means responsive to arrival of the pressure at the said predetermined value for positioning the said other valve part with respect to the said one valve part to block the escape of fluid from both conduits, said last mentioned means comprising a pair of spaced bellows, one containing a vacuum and the other connected to said pressure, the said pair of cooperating valve parts being positioned between the bellows, means connecting the bellows, and means connecting the said other valve part with the bellows-connecting means for conjoint movement therewith.

7. In combination, a first bellows containing a vacuum, a second bellows attached directly adjacent the first bellows, a third bellows spaced from the first and second bellows and connected to a source of pressure, an operator in the form of a tube connecting the second and third bellows for subjecting the second bellows to the said pressure, the second bellows subtracting from the effect of the third bellows because of the connection of the operating tube between the second and third bellows, and means restricting the tube at one region for causing sudden changes in the said pressure to speed the effect of the control exerted by temporarily halting the subtracting effect of the second bellows upon the third bellows.

8. In the combination specified in claim 7, the restricting means being at the end of the tube adjacent the second bellows.

9. The combination with a supercharger having a pumping limit and a regulator for obtaining a predetermined value of pressure of gas delivered by the supercharger and for controlling the flow through the supercharger to keep the same within the pumping limit; of apparatus for setting the regulator, comprising a casing shiftable to a position representing the predetermined value of gas pressure, a member mounted within the casing and connected to the regulator, a pair of conduits for fluid leading to opposite sides of the member, a pair of cooperating valve parts blocking escape of fluid from said conduits for providing a fluid lock of the member in the casing and thereby causing movement of the casing to its said position to bring the member and the regulator to an approximate position for the said predetermined value of gas pressure, means connecting one valve part with the casing for causing the said movement of the casing to shift the said one valve part with respect to the other valve part and thereby to admit fluid under pressure to the conduit leading to one side of the member and to open the other conduit to drain for moving the member for an accurate positioning of the regulator for obtaining the said predetermined value of gas pressure, means responsive to arrival of the gas pressure at the said predetermined value for positioning the said other valve part with respect to the said one valve part to block the escape of fluid from both conduits, and means responsive to approach or arrival of a condition of pumping limit in the supercharger for shifting the said other valve part in a direction to open the conduits to fluid under pressure and drain to move the member with respect to the casing in a direction causing the regulator to increase the flow through the supercharger.

10. The combination with a supercharger having a pumping limit and a regulator for obtaining a predetermined value of pressure of gas delivered by the supercharger and for controlling the flow through the supercharger to keep the same within the pumping limit; of apparatus for setting the regulator comprising a casing shiftable to a position representing the predetermined value of gas pressure, a member mounted within the casing and connected to the regulator, a pair of conduits for fluid leading to opposite sides of the member, a pair of cooperating valve parts blocking escape of fluid from said conduits for providing a fluid lock of the member in the casing and thereby causing movement of the casing to its said position to bring the member and the regulator to an approximate position for the said predetermined value of gas pressure, means connecting one valve part with the casing for causing the said movement of the casing to shift the said one valve part with respect to the other part and thereby to admit fluid under pressure to the conduit leading to one side of the member and to open the other conduit to drain for moving the member for an accurate positioning of the regulator for obtaining the said predetermined value of gas pressure, means responsive to arrival of the gas pressure at the said predetermined value for positioning the said other valve part with respect to the said one valve part to block the escape of fluid from both conduits, said last mentioned means comprising a unit formed of a first bellows containing a vacuum, a second bellows spaced from the first bellows and subjected to the said gas pressure, means connecting the bellows, and means connecting the said other valve part and the bellows-connecting means, and means responsive to arrival or approach of pumping limit in the supercharger and including means for supplying fluid under pressure against one end of the unit for shifting the unit and therewith, the said other valve part in a direction to open the conduits to fluid under pressure and drain to move the member with respect to the casing in a direction causing the regulator to increase the flow through the supercharger.

11. The combination with a supercharger having a pumping limit and a regulator for obtaining a predetermined value of discharge pressure of gas delivered by the supercharger and for controlling flow through the supercharger to keep the same within the pumping limit; of apparatus for setting the regulator comprising a casing shiftable to a position representing the predetermined value of gas pressure, a member mounted within the casing and connected to the regulator, a pair of conduits for fluid leading to opposite sides of the member, a pair of cooperating valve parts blocking escape of fluid from said conduits for providing a fluid lock of the member in the casing and thereby causing movement of the casing to its said position to bring the member and the regulator to an approximate position for the said predetermined value of gas pressure, means connecting one valve part with the casing for causing the said movement of the casing to shift the said one valve part with respect to the other valve part and thereby to admit fluid under pressure to the conduit leading to one side of the member and to open the other conduit to drain for moving the member for an accurate positioning of the regulator for obtaining the said predetermined value of gas pressure, means responsive to arrival of the gas pressure at the said predetermined value for positioning the said other valve part with respect to the said one valve part to block the escape of fluid from both conduits, said last mentioned means comprising a unit formed of a first bellows containing a vacuum, a second bellows spaced from the first bellows and subjected to the said gas pressure, means connecting the said other valve part and the bellows-connecting means, and means responsive to arrival or approach of pumping limit in the supercharger and including a third bellows attached to the first bellows and means for supplying fluid under pressure within the third bellows for shifting the unit and therewith the said other valve part in a direction to open the conduits to fluid under pressure and drain to move the member with respect to the casing in a direction causing the regulator to increase the flow through the supercharger.

12. The combination with a supercharger having a pumping limit and a regulator for obtaining a predetermined value of pressure of gas delivered by the supercharger and for keeping the supercharger within the pumping limit; of apparatus for setting the regulator, comprising a first member shiftable to a position representing the said desired value of gas pressure, a second member adjustable with respect to the first member and connected with the regulator, fluid means for controlling the adjustment of the second member with respect to the first member, valve parts relatively positionable for causing the fluid means to adjust the second member with respect to the first member in one direction and in the opposite direction and to provide a fluid lock of the second member with respect to the first member, means for shifting the first member to its aforesaid position representing the said predetermined value of pressure to cause the fluid lock of the second member due to the relative position of the valve parts to move the second member to an approximate position representing the said predetermined value of gas pressure, means connecting one valve part to the first member for causing the aforesaid shifting of the first member to produce a relative positioning of the valve parts breaking the fluid lock for adjusting the second member for the sake of an accurate positioning of the valve to obtain the said predetermined value of gas pressure, means responsive to arrival of the gas pressure at the said predetermined value for positioning the other valve part to produce the fluid lock of the second member with respect to the first member, and means responsive to approach or arrival of a condition of pumping limit in the supercharger for shifting the said other valve part in a direction to open the conduits to fluid under pressure and drain to move the member with respect to the casing in a direction causing the regulator to increase the flow through the supercharger.

13. The combination with a supercharger and a regulator for controlling the pressure of gas delivered by the supercharger; of an apparatus for setting the regulator, comprising a first bellows containing a vacuum, a second bellows attached directly adjacent the first bellows and having a restricted opening, a third bellows spaced from the first and second bellows and connected to discharge pressure and being free of restriction, means connecting the third bellows with the first and second bellows, means connecting the bellows-connecting means and the regulator, the second bellows subtracting from the effect of the third bellows because of connection of the regulator with the bellows-connecting means between the second and third bellows, and means for supplying discharge pressure to the second bellows through the restricted opening for causing sudden changes in the discharge pressure to speed the effect of the control exerted by temporarily halting the subtracting effect of the second bellows upon the third bellows.

14. The combination with a supercharger having a pumping limit and a regulator for obtaining a predetermined value of pressure of gas delivered by the supercharger and for controlling the flow through the supercharger to keep the same within the pumping limit; of apparatus for setting the regulator comprising a first bellows containing a vacuum, a second bellows attached directly adjacent the first bellows, a third bellows spaced from the first and second bellows and subjected to intake pressure, a tube connecting the second and third bellows for subjecting the second bellows to the gas pressure, means connecting the tube and the regulator for adjusting the regulator from the position of the tube as determined by the bellows, the second bellows subtracting from the effect of the third bellows because of connection of the regulator with the tube between the second and third bellows, means restricting the tube at one region for causing sudden changes in the gas pressure to speed the effect of the regulator by temporarily halting the subtracting effect of the second bellows upon the third bellows, a fourth bellows attached to the first bellows, and means for supplying fluid under pressure to the fourth bellows in response to arrival or approach of the pumping limit in the supercharger to adjust the fourth bellows and therewith the tube connecting the second and third bellows for causing the regulator to increase the flow through the supercharger to keep the same within the pumping limit.

15. The combination with a supercharger having a pumping limit and a regulator for obtaining a predetermined value of pressure of gas delivered by the supercharger and for controlling flow through the supercharger to keep the same within the pumping limit; of apparatus for setting the regulator comprising a first member shiftable to a position representing the said desired value of gas pressure, a second member adjustable with respect to the first member and connected with the regulator, fluid means for controlling the adjustment of the second member with respect to the first member, valve parts relatively positionable for causing the fluid means to adjust the second member with respect to the first member in one direction and in the opposite direction and to provide a fluid lock of the second member with respect to the first member, means for shifting the first member to its aforesaid position representing the said predetermined value of gas pressure to cause the fluid lock of the second member due to the relative position of the valve parts to move the second member to an approximate position representing the said predetermined value of gas pressure, means connecting one valve part to the first member for causing the aforesaid shifting of the first member to produce a relative positioning of the valve parts breaking the fluid lock for adjusting the second member for the sake of an accurate positioning of the valve to obtain the said predetermined value of gas pressure, a first bellows containing a vacuum, a second bellows attached directly adjacent the first bellows, the first and second bellows being to one side of the valve parts, a third bellows spaced from the first and second bellows on the opposite side of the valve parts, means connecting the second and third bellows to intake vacuum, means connecting the third bellows with the first and second bellows, means connecting the bellows-connecting means and the other valve part for causing the second and third bellows in response to arrival of the gas pressure at the said predetermined value for positioning the said other valve part to produce the fluid lock of the second member with respect to the first member, the second and third bellows serving to position the said other valve part in accordance with the gas pressure with the second bellows having a subtracting effect upon the third bellows due to the positioning of the valve part between the second and third bellows, means forming a restriction in the connection of the second bellows to the gas pressure for causing sudden changes in gas pressure to speed the shifting of the said other valve part by temporarily halting the subtracting effect of the second bellows upon the third bellows, and means responsive to approach or arrival of a condition of pumping limit in the supercharger for acting against the first bellows to shift the said other valve part in a direction to open the conduits to fluid under pressure and drain to move the member with respect to the casing in a direction causing the regulator to increase the flow through the supercharger.

16. The combination with a supercharger having a pumping limit and a regulator for obtaining a predetermined value of pressure of gas delivered by the supercharger and for controlling the flow through the supercharger to keep the same within the pumping limit; of apparatus for setting the regulator, comprising a first member shiftable to a position representing the said desired value of gas pressure, a second member adjustable with respect to the first member and connected with the regulator, fluid means for controlling the adjustment of the second member with respect to the first member, valve parts relatively positionable for causing the fluid means to adjust the second member with respect to the first member in one direction and in the opposite direction and to provide a fluid lock of the second member with respect to the first member, means for shifting the first member to its aforesaid position representing the said predetermined value of gas pressure to cause the fluid lock of the second member due to the relative position of the valve parts to move the second member to an approximate position representing the said predetermined value of gas pressure, means connecting one valve part to the first member for causing the aforesaid shifting of the first member to produce a relative positioning of the valve parts breaking the fluid lock for adjusting the second member for the sake of an accurate positioning of the valve to obtain the said predetermined value of gas pressure, a first bellows containing a vacuum, a second bellows attached directly adjacent the first bellows, the first and second bellows being to one side of the valve parts, a third bellows spaced from the first and second bellows on the opposite side of the valve parts, means connecting the second and third bellows to intake vacuum, means connecting the third bellows with the first and second bellows, means connecting the bellows-connecting means and the other valve part for causing the second and third bellows in response to arrival of the gas pressure at the said predetermined value for positioning the said other valve part to produce the fluid lock of the second member with respect to the first member, a fluid-pressure-responsive device attached to the first bellows, means for supplying fluid under pressure to the device, and means responsive to arrival or approach of the pumping limit in the supercharger for acting through the pressure fluid to shift the device and therewith the said other valve part for breaking the fluid lock between the members and adjusting the regulator through the members to increase the flow through the supercharger for maintaining the supercharger within the pumping limit.

HENRY W. GILFILLAN.

REFERENCES CITED

The following references are of record in the file of this patent:

UNITED STATES PATENTS

| Number | Name | Date |
| --- | --- | --- |
| 1,713,833 | Kochendorfer | May 21, 1929 |
| 1,866,284 | Adelson | July 5, 1932 |
| 2,005,773 | Florez | June 25, 1935 |
| 2,093,119 | Moore | Sept. 14, 1937 |
| 2,117,800 | Harrison et al. | May 17, 1938 |
| 2,267,437 | Alfaro | Dec. 23, 1941 |
| 2,276,505 | Moore | Mar. 17, 1942 |
| 2,283,175 | Berger | May 19, 1942 |
| 2,305,070 | Butler | Dec. 15, 1942 |
| 2,316,416 | Gregg | Apr. 13, 1943 |
| 2,373,139 | Morris | Apr. 10, 1945 |
| 2,374,708 | Shoults | May 1, 1945 |
| 2,390,043 | Borden | Dec. 4, 1945 |
| 2,398,619 | Clark et al. | Apr. 16, 1946 |
| 2,402,885 | Gilfillan et al. | June 25, 1946 |
| 2,404,323 | Staley | July 16, 1946 |
| 2,404,324 | Staley | July 16, 1946 |